(12) United States Patent
Accarion

(10) Patent No.: US 6,195,350 B1
(45) Date of Patent: Feb. 27, 2001

(54) DATA FRAME SWITCH

(75) Inventor: Michel Accarion, Nantes (FR)

(73) Assignee: Alcatel Data Networks INC, Asburn, VA (US)

( * ) Notice: Subject to any disclaimer, the term of this patent is extended or adjusted under 35 U.S.C. 154(b) by 0 days.

(21) Appl. No.: 09/007,179

(22) Filed: Jan. 14, 1998

(30) Foreign Application Priority Data

Jan. 16, 1997 (FR) .................................................. 97 00392

(51) Int. Cl.[7] ...................................................... H04J 3/24
(52) U.S. Cl. ........................ 370/389; 370/386; 370/395; 370/400
(58) Field of Search .................................... 370/232, 387, 370/389, 395, 400, 426, 451, 510, 507, 522, 386

(56) References Cited

U.S. PATENT DOCUMENTS

| 4,271,505 | * | 6/1981 | Menot et al. | 370/400 |
|---|---|---|---|---|
| 4,491,944 | * | 1/1985 | Caizergues et al. | 370/387 |
| 5,453,979 | | 9/1995 | Schibler et al. | 370/60.1 |
| 5,485,455 | | 1/1996 | Dobbins et al. | 370/60 |
| 5,522,042 | | 5/1996 | Fee et al. | 395/200.01 |
| 5,896,371 | * | 4/1999 | Kobayashi et al. | 370/232 |
| 6,031,843 | * | 2/2000 | Swanbery et al. | 370/426 |

* cited by examiner

*Primary Examiner*—Douglas Olms
*Assistant Examiner*—Shick Hom
(74) *Attorney, Agent, or Firm*—Sughrue, Mion, Zinn, Macpeak & Seas, PLLC

(57) ABSTRACT

A switch that makes it possible in real-time to determine paths that are suitable for interconnecting line termination functional entities of couplers. The switch includes a centralization device capable of centralizing information concerning the state of all the line termination functional entity situated in the couplers and a centralization device common to all couplers of the switch to centralize, in particular, all of the information centralized by the first centralizing device. Additionally, the switch is capable of establishing a routing table listing all of the active paths existing between frame relaying line termination functional entities. The switch is particularly applicable to distributors for frame relaying links.

6 Claims, 5 Drawing Sheets

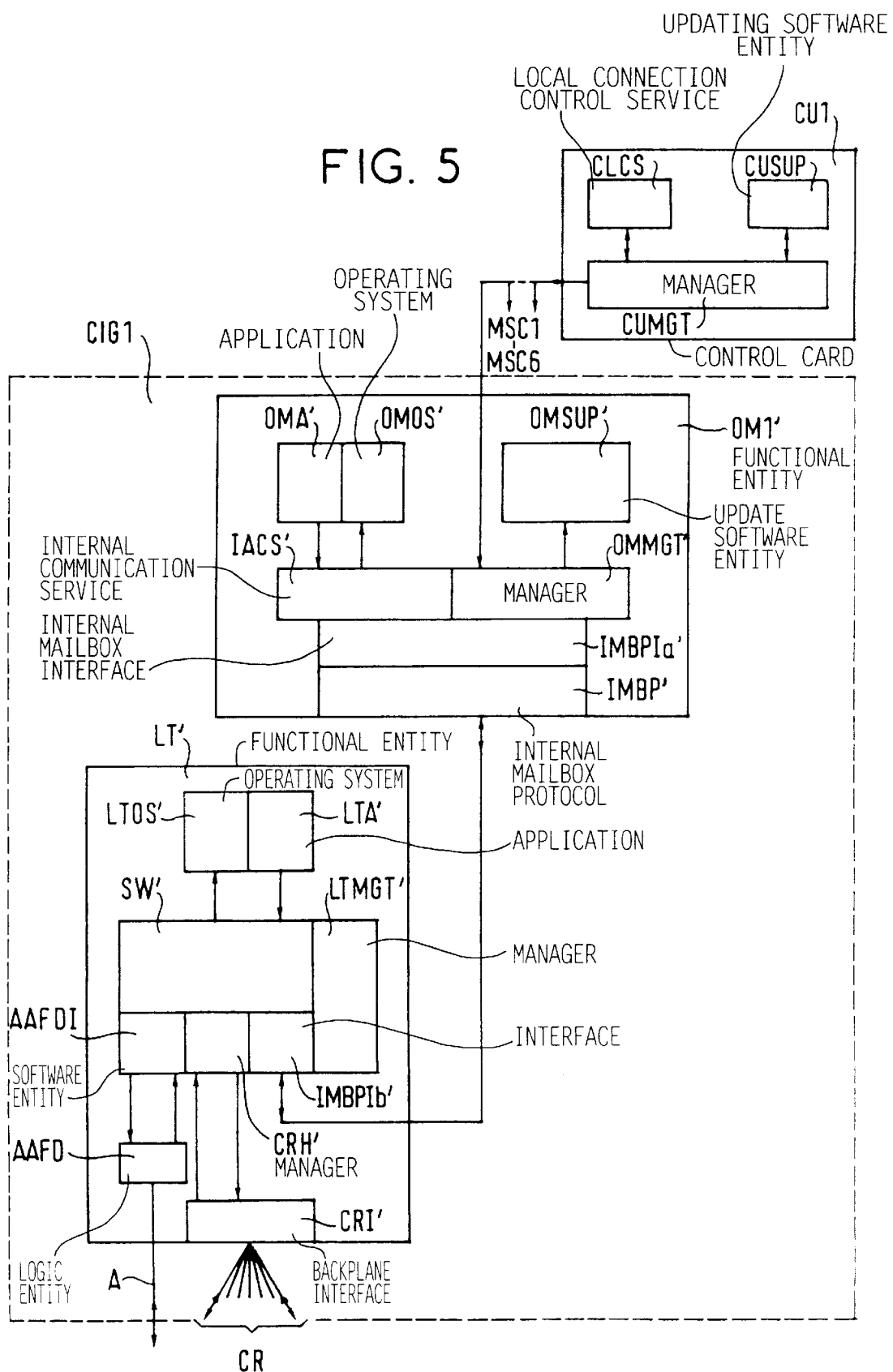

DATA FRAME SWITCH

The invention relates to a data frame switch, in particular for the purpose of implementing a distributor. Such a distributor may also include access ports for asynchronous transfer mode (ATM) cells.

BACKGROUND OF THE INVENTION

A switch must set up connections between its access ports. In the special case of a distributor, these connections are semipermanent. A switch is modular in structure. The access ports are generally distributed over a plurality of electronic circuit cards referred to as "couplers". In general, it is possible to add coupler cards in order to increase the capacity of a switch.

Conventionally, couplers are interconnected by means of a bus for the purpose of transferring data from one coupler to another. Possibly, a redundant second bus is provided to remedy failure of the first bus.

Another architecture is known, in particular from French patent application No. 2 665 314, in which each coupler is connected via an independent both-way link to each of the other couplers. in other words, there is one link for each combination of two couplers. Those links are implemented by means of a backplane having a large number of layers. Each coupler may be backed-up by another coupler in the event of failure. Since that architecture does not have a bus that is common to all of the couplers, it avoids any possibility of blocking due to excess traffic in any given direction, and it also avoids any possibility of the entire switch being blocked by one of the couplers operating wrongly. The present invention relates more particularly to that type of switch.

In that type of switch, forwarding from one access port to another takes place over a path that passes via two couplers. When a coupler is added, when a coupler is removed, and when a coupler breaks down partially or completely, it is necessary for all of the possible paths to be determined anew. In order to enable the paths to be determined in real time, it is necessary for path determination to be performed automatically, i.e. without requiring a human operator to intervene. Also, it is desirable for the means used to be capable of being protected against the possibility of failure in a resource that is used for path determination.

OBJECT AND SUMMARY OF THE INVENTION

The object of the invention is to propose means enabling paths to be determined automatically, and ensuring:
good performance in relaying frames; and
security of signalling interchanges which take place prior to a link being set up to transfer data by relaying frames.

The invention provides a data frame switch comprising at least a first subassembly comprising:
a plurality of "medium speed" couplers each comprising:
at least one functional entity for line termination coupled to at least one input/output for data frames; and
first centralization means for centralizing information in the coupler concerning the states of all of the line termination functional entities situated in the coupler;
links such that each medium speed coupler is connected directly to each of the other medium speed couplers by at least one link specific to the coupler;
second centralization means common to the switch as a whole:
to centralize for the switch all of the information centralized by the first centralization means in each medium speed coupler; and
to establish a first routing table listing all of the active paths existing between functional entities for terminating frame-relaying lines;
wherein the line termination functional entities, the first centralization means, and the second centralization means all comprise software entities, each designated by a predetermined identifier, and all comprise processors designated by respective processor identifiers determined by software identities as a function of the current configuration of the switch;
and wherein for communication between two software entities, each software entity has an address comprising both the identifier of the processor executing said entity and the identifier of said entity.

This switch automatically makes a new determination of which paths are possible from the links suitable for constituting paths for each combination of two access ports, and it does so each time the configuration of the switch is modified since the first and second centralization means serve to collect in a single point all of the information necessary for determining all of the paths. The routing table can then be broadcast to all of the entities that may require it. Also, processor identification is automatic because said identifiers are determined dynamically as a function of the current configuration of the switch. The switch thus has the advantage of enabling the configuration of the switch to be modified merely by adding cards: there is no need to interrupt operation of the switch, and the user does not have to give the switch an identifier for each additional processor.

In a particular embodiment, each processor identifier is made up of a chassis number, a card location number, and a logical number.

In a particular embodiment, communication between two software entities may be of a quality selected from two qualities:
communication that is not secure but that provides maximum performance during a data transfer stage; or
communication that is secure and that is adapted to interchanges leading up to the data transfer stage.

In a particular embodiment, said first subassembly further comprises:
a plurality of "high speed" couplers each including at least one functional entity for terminating an asynchronous transfer mode (ATM) line;
at least one gateway having:
at least a first input/output coupled to at least one line termination functional entity for ATM cells; and
a plurality of data frame inputs/outputs respectively and directly connected to each medium speed coupler via links such that each medium speed coupler is connected directly to one of the inputs/outputs of the gateway via at least one link specific to the coupler; and
an ATM switching matrix connected to an input/output of each high speed coupler and to the first input/output of the gateway to set up ATM connections;
and the second centralization means initialize and update a second table referred to as a "common ATM routing table", containing the references of all the ATM connections set up by said matrix in said first subassembly.

This embodiment also makes it possible to determine in real time paths constituted by ATM links that enable a plurality of chassis to be interconnected, each chassis containing a subassembly of the switch of the invention.

In a particular embodiment, a switch includes at least one second subassembly comprising:

- a plurality of "medium speed" couplers each comprising at least one line termination functional entity coupled to at least one input/output for data frames;
- a plurality of "high speed" couplers each comprising at least one ATM line termination functional entity, with at least one of the high speed couplers of the second subassembly being connected by an ATM line to a high speed coupler of the first subassembly;
- at least one gateway having:
  - at least a first input/output coupled to at least one line termination functional entity for ATM cells; and
  - a plurality of data frame inputs/outputs connected respectively and directly to each medium speed coupler via links such that each medium speed coupler is connected directly to one of the inputs/outputs of the gateway via at least link specific to said coupler; and
- links such that each coupler of the second subassembly is connected directly to each of the other couplers of the second subassembly via at least one link specific to the coupler;
- and the second centralization means of the first subassembly also:
  - centralize for the switch all of the information centralized by the first centralization means of all of the medium speed couplers;
  - establish a first routing table listing all of the active paths existing in the second subassembly between line termination functional entities for relaying frames; and
  - initialize and update a common ATM routing table containing the references of all of the ATM connections set up by the matrix in said second subassembly.

In a particular embodiment, if one of the subassemblies includes a plurality of gateways, and load sharing between the gateways is achieved automatically when a plurality of paths are possible between the two subassemblies.

BRIEF DESCRIPTION OF THE DRAWINGS

The invention will be better understood and other characteristics will appear from the following description of three embodiments of the switch of the invention, described with reference to the accompanying drawings, in which:

FIG. 5 is a functional diagram of a gateway card which is used among the means shown in FIG. 3.

MORE DETAILED DESCRIPTION

Figure 1:
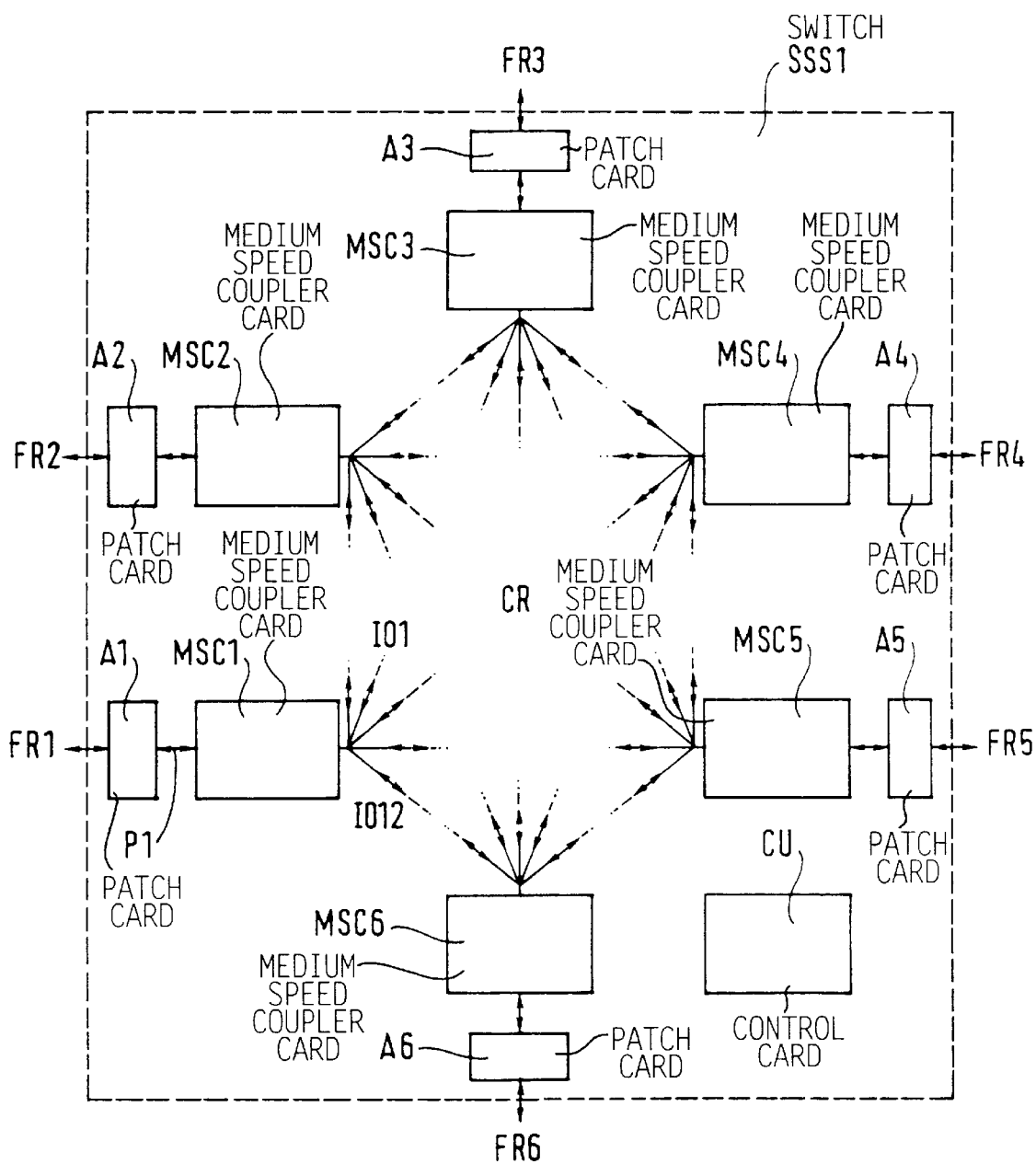
FIG. 1 is a block diagram of a first embodiment of a switch of the invention having a single set of couplers that are interconnected via a single backplane, and that is designed to switch only frames of data.

FIG. 1 is a block diagram of a first embodiment SS1 of a switch of the invention. As explained below, it may also constitute a subassembly in a second embodiment that is also capable of being connected to ATM lines. This first embodiment comprises:

- six "medium speed" coupler cards MSC1, . . . , MSC6, each having twelve inputs/outputs IO1, . . . , IO12 interconnected via a backplane CR;
- six cards A1, . . . , A6 referred to herein as "patches" that are associated respectively with the six coupler cards MSC1, . . . , MSC6, with each patch card having two inputs/outputs connected respectively to an access port of the switch and to an input/output of the corresponding coupler card, e.g. the input/output P1 of coupler card MSC1; and
- a control card CU having inputs/outputs connected to the respective coupler cards MSC1, . . . , MSC6 via links that are shown in part only.

All of the patch cards A1, . . . , A6 are interconnected via a link that is not shown. In the event of one of the coupler cards MSC1, . . . , MSC6 failing, the corresponding patch card is caused to connect its access port to another predetermined coupler card that is available and in working order. Since the invention does not relate to this security feature, it is not described in greater detail.

Each coupler card MSC1, . . . , MSC6 performs three major functions:

line termination;

operations and maintenance; and interfacing with the backplane

The line termination function consists in switching and in processing frame relay traffic, and in matching the coupler to a line in collaboration with the patch associated with the coupler. The operations and maintenance function consists in particular in interchanging control and status information with the control card CU and with corresponding other operations and maintenance functions in the other couplers. The interface function consists in storing data in a buffer memory before transmitting it to the backplane, and in storing data in another buffer memory after receiving it from the backplane.

Figure 2:
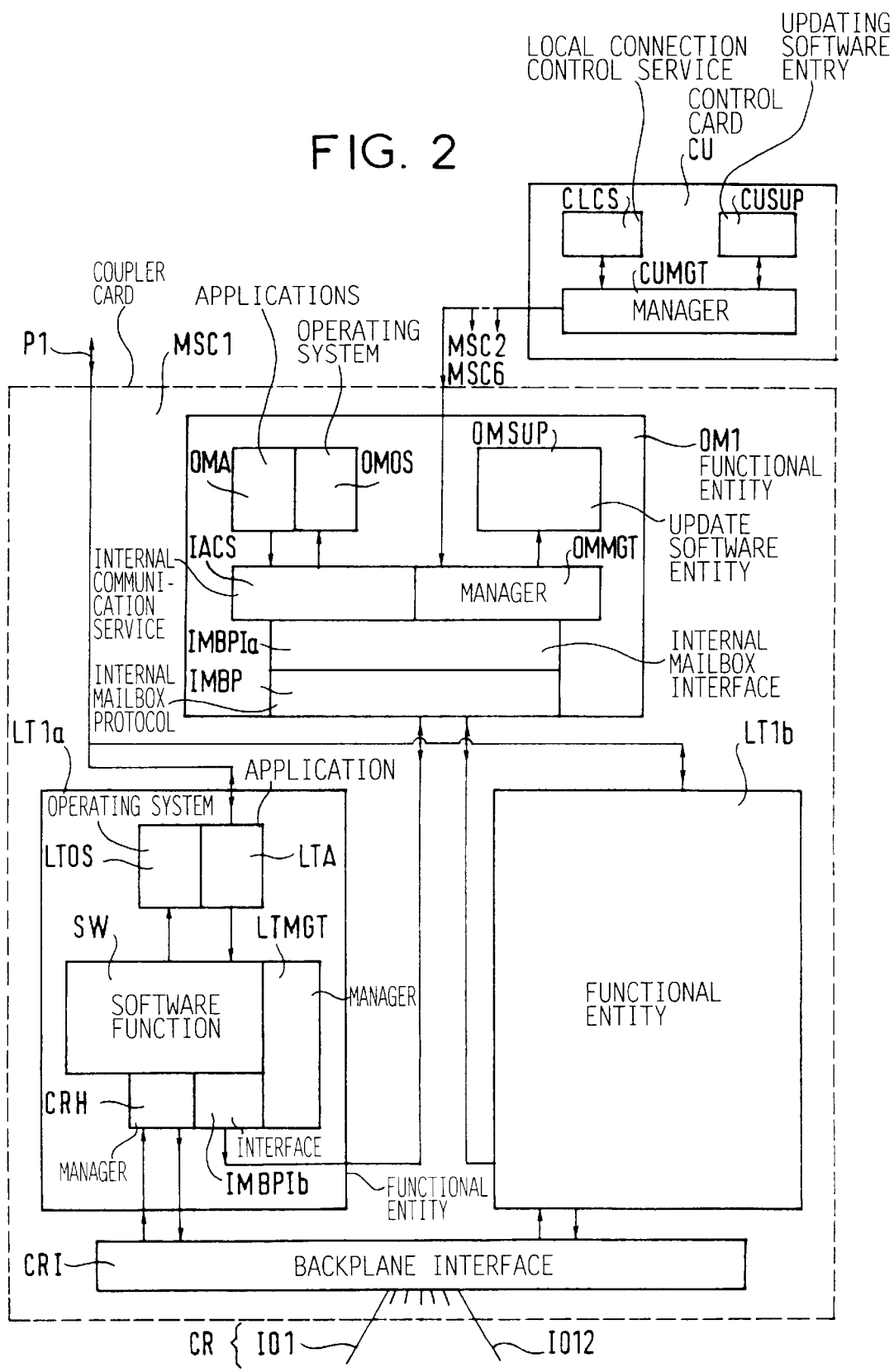
FIG. 2 is a functional diagram of a coupler card for frame-relaying lines, and used in the embodiment shown in FIG. 1.

FIG. 2 is a functional diagram of the coupler MSC1, chosen by way of example, and of the control card CU. The coupler card MSC1 includes the following functional entities:

a functional entity OM1 for operations and maintenance;

two functional entities LT1$a$ and LT1$b$ for line termination; and an interface circuit CRI including the inputs/outputs IO1 to IO12.

The functional entities LT1$a$ and LT1$b$ are coupled to input/output P1 to receive and to transmit data frames The entities LT1$a$ and LT1$b$ are also coupled to the backplane CR via the circuit CRI. This circuit is common to both entities LT1$a$ and LT1$b$, and it therefore includes an arbitration device (not shown), to allocate access rights to only one of the entities at a time.

Each input/output IO1, . . . , IO12 is connected via the backplane CR to a respective input/output of another coupler card MSC2, . . . , MSC6. To set up a connection between any two access ports, e.g. FR2 and FR6, the couplers MSC2 and MSC6 corresponding to said access ports establish communication over one of the two links which directly interconnect them in the backplane CR.

To switch data frames and to interchange signalling, the functional entities LT1a and LT1b interchange messages between each other and with corresponding entities in the other coupler cards via the backplane CR. They also interchange messages with the entity OM1. This entity also interchanges messages with the control card CU. However, it does not interchange any messages with the corresponding operations and maintenance entities situated in the other coupler cards.

Each functional entity LT1a and LT1b is implemented by means of a plurality of software entities:
  an operating system LTOS;
  line termination applications LTA, each designated by an identifier SUID; these applications process the data frames which are to be switched;
  a message transfer function SW;
  a line termination manager LTMGT;
  a backplane manager CRH containing in particular a routing table for the backplane CR in order to forward each message as a function of the identifier LPX of the processor supporting the destination software entity if such a path does indeed exist; and serving to receive messages forwarded via the backplane CR;
  an interface IMBPIb for an internal mailbox; and
  an interface CRI for the backplane interface.

In this example, the functional entities LT1a, LT1b, and OM1 are supported by three distinct respective "physical" processors. In other embodiments, a single "physical" processor may support a plurality of "logical" processors each supporting a plurality of functional entities.

Each functional entity is constituted by one or more software entities Each software entity is identified by a respective identifier SUID. The identifiers SUID are static: they are allocated during development of the software entities.

Each processor (whether "physical" or "logical") is identified by an identifier LPX which is specific thereto and which is made up of a chassis number, a card emplacement number, and a logical number. LPX identifiers are allocated dynamically, they are determined by software entities as a function of the current configuration of the switch, i.e. as a function of the specific cards implemented to constitute the switch in question. This process of allocating LPX identifiers has the advantage of enabling the configuration of the switch to be modified merely by adding cards: there is no need to interrupt the operation of the switch, and the user does not need to give an identifier for each additional processor. These LPX and SUID identifiers constitute addresses that can be used to establish communication between a "source" software entity SUIDs and a "destination" software entity SUIDd, respectively designated by the following pairs of addresses LPXs & SUIDs and LPXd & SUIDd where LPXs and LPXd are the respective identifiers of the processors respectively executing the two entities.

Setting up the communication consists in determining a path between these two addresses. The process for allocating LPX identifiers thus makes it possible to establish communication between two software entities situated on the same card or on two different cards, via the backplane CR, without the user having to be concerned by modifications to the configuration of the switch.

The functional entity OM1 is implemented by means of the following software entities:
  an operating system OMOS;
  applications OMA;
  an update software entity OMSUP;
  an internal communication service IACS;
  a manager OMMGT;
  an internal mailbox interface IMBPIa; and
  an internal mailbox protocol IMBP.

The internal communication service software entity IACS provides a gateway between the environment of the operating system OMOS and the environment of the operating system LTOS of functional entity LT1, these two operating systems not being identical.

The control card CU has a single functional entity implemented by means of the following software entities:
  a local connection control service CLCS;
  an updating software entity CUSUP; and
  a manager CUMGT.

The operation of each coupler card MSC1, . . . , MSC5 includes an initialization stage when the card is plugged into the backplane CR. The line termination manager LTMGT is activated by the operating system LTOS when the coupler card starts. The backplane manager CRH needs a routing table to be able to forward messages. During the initialization stage of a coupler card, the routing table of the manager CRH is initialized in such a manner that the functional entity LT1a can communicate via the backplane only with the functional entity LT1b of the same coupler card during the initialization period. The same applies for the manager LTMGT of the entity LT1b.

Each of the applications LTA of each functional entity LT1a and LT1b then sends a "declaration" message to the local message transfer software function SW to indicate that it is active. This message contains, in particular: the identifier SUID of the entity; the identifier LPX of the processor supporting it; and the physical address of said application, i.e. the address to which messages for the application can be addressed. The software function SW updates a table by writing this information therein, together with the addresses of processes associated with the identifiers SUID, said processes serving to transfer messages destined for the entities corresponding to said identifiers. The software function SW sends a copy of the table to the manager OMMGT of the functional entity OM1. This manager also receives a similar table from the software function SW of the functional entity LT1b. It sends a copy of these tables to the entity CUMGT of the control card CU, which centralizes them for the entire switch SS1

After the initialization stage, the functional entities LT1a and LT1b receive a routing table plus updates supplied by the control card CU via the functional entity OM1.

The software entity CUSUP interchanges "correct operation" messages with each OMSUP, using the entity IACS. The entity OMSUP performs local scanning to monitor whether the entities LT1a and LT1b are operating correctly. It can then inform the entity CUSUP about the state of the processors. The software entity CUSUP warns the manager CUMGT of any modification in the configuration of the switch.

The manager CUMGT is responsible for:
  initializing and keeping up to date a routing table for the backplane;
  establishing communication sessions by the internal communication service IACS with the functional entities OMMGT situated in all of the coupler cards; and
  securing routing data in the event of the control card CU restarting.

To initialize the routing table concerning the backplane CR, and to keep it up to date, the manager CUMGT distinguishes between at least two states for each functional entity: out of service; and in service. For each coupler, it distinguishes between two possible functions: normal coupler; or back-up coupler. The manager CUMGT is alerted by the updating software entity CUSUP, particularly on each occasion that a coupler card is added or removed. The manager CUMPGT establishes a communication session with all of the managers OMMGT on the other coupler cards MSC2, . . . , MSC6. The routing table is loaded into the managers OMMGT of all of the functional entities, and in particular into OM1.

The managers CUMGT and OMMGT implement a data management protocol that makes it possible to save the context of the couplers and the routing table in the event of the coupler under consideration restarting. Also, the manager CUMPGT and the managers OMGT in all of the coupler cards restore the internal communication service session.

The manager OMMGT receives the routing table supplied by the manager CUMGT during initialization and on each update of said routing table. The manger OMMGT then communicates this table to the respective managers LTMGT of the line termination functional entities LT1a and LT1b. Also, the manager OMMGT informs the updating software entity CUSUP when one of the functional entities LT1a and LT1b becomes accessible, and when it becomes inaccessible, mentioning the identifier LPX of the processor supporting the entity under consideration.

The message transfer software function SW performs the following functions:

Managing the declarations of the applications LTA, i.e. informing the functional unit OM1 of the identifiers SUID of said applications.

Processing messages:
  received from said applications LTA; or
  retransmitted by the backplane manager CRH when it receives a message from the backplane interface CRI; or
  retransmitted by the interface IMBPIb from the functional entity OM1 via the mailbox IMBP.

The software function SW analyses the identifier LPW of the processor of the destination functional entity, which identifier is contained in each message that it received:

If the identifier LPX indicates that the destination of the message is a software entity that is executed by the same processor as the processor executing the software function SW, then that function uses a table of the SUID identifiers of the locally known software entities to retransmit the message to the destination entity.

If the identifier LPX indicates that the designation of the message is one of the applications OMA of the functional entity OM1, the software function SW transfers the message to the interface IMBPIb of the entity LT1a for transfer to the mailbox box IMPB of the entity OM1.

If the identifier LPX indicates that the destination software entity is not performed locally, then the software function SW transmits the message to the backplane manager CRH for it to be forwarded via the backplane CR by means of a hardware mechanism that ensures that the receiving manager CRH has given a buffer to receive the data.

Figure 3:
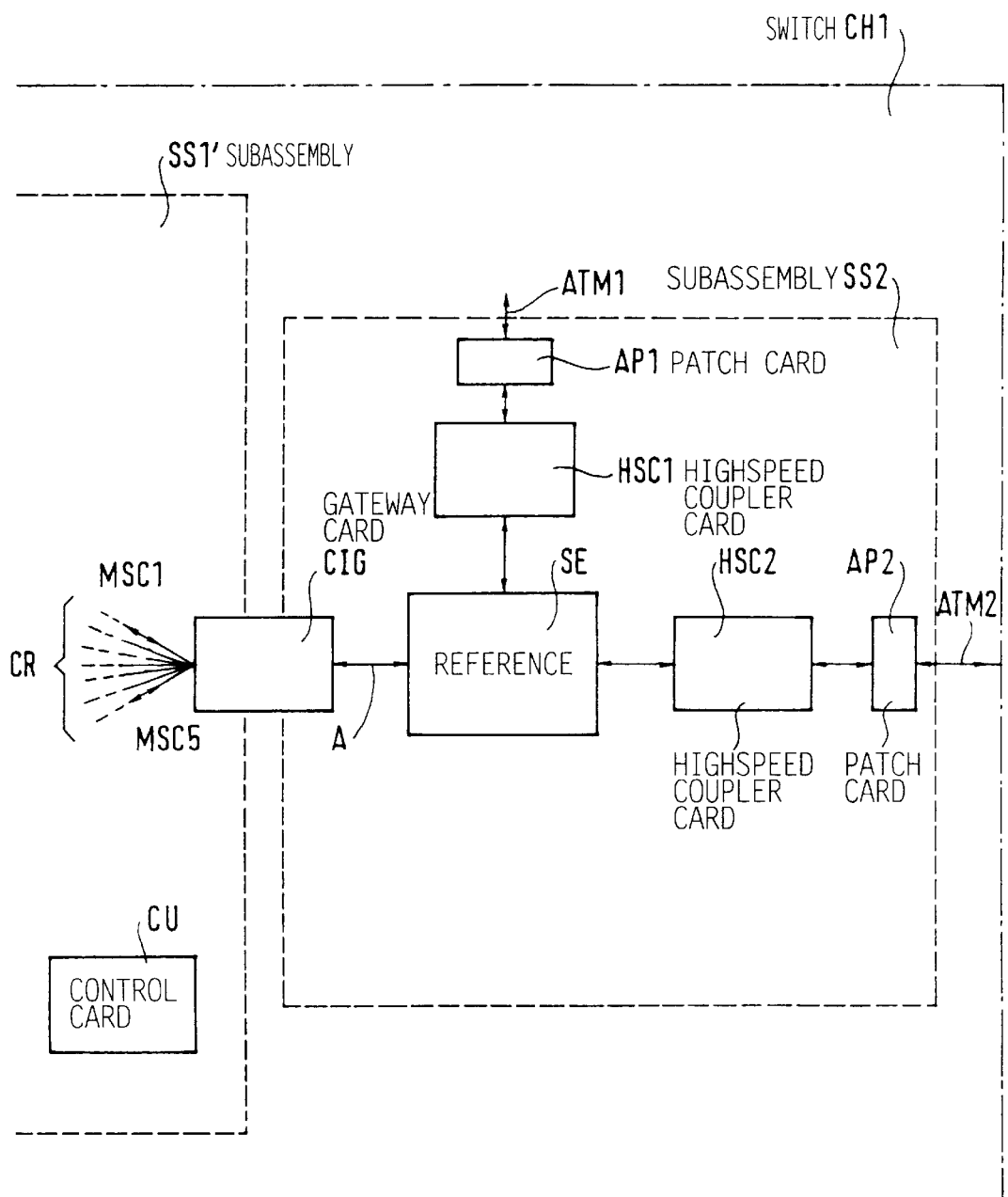
FIG. 3 is a block diagram of a second embodiment capable of being connected to frame-relaying lines and to ATM lines; and enabling a plurality of identical chassis to be interconnected by means of internal ATM links in order to build up a switch of larger capacity.

FIG. 3 is a block diagram of a second embodiment of the switch of the invention. This second embodiment comprises two subassemblies: SS1' and SS2. The subassembly SS1' is identical to the first embodiment SS1 described above with reference to FIGS. 1 and 2, except that its control card CU is different in that it needs to perform additional functions described below; and except that the coupler MSC6 is replaced by a gateway card CIG. The card CU may be duplicated for back-up purposes in the event of failure. The second subassembly SS2 is designed to be connected to asynchronous transfer mode lines ATM1 and ATM2. These two subassemblies are constituted by cards inserted into the same backplane CR in a chassis CH1.

The gateway card CIG possess twelve inputs/outputs of which five are respectively connected to one input/output in each of the medium speed coupler cards (not shown) MSC1, . . . , MSC5 of the subassembly SS1'. The gateway card CIG also possesses an ATM input/output referenced A.

The subassembly SS2 comprises:
  two "high speed" coupler cards HSC1 and HSC2 each including at least one ATM line termination functional entity (not shown);
  two patch cards AP1 and AP2 respectively associated with the coupler cards HSC1 and HSC2, and each having:
    a first input/output connected to a respective ATM input/output of the coupler cards HSC1 and HSC2; and
    a second input/output constituting a respective one of the access ports ATM1 and ATM2 of the switch, these access ports being designed for connection to ATM lines;
  a switching matrix ATM, referenced SE, having sixteen inputs/outputs, three of which are connected respectively to the input/output A of the gateway card CIG, and to the second ATM inputs/outputs of the two coupler cards HSC1 and HSC2.

All of these cards are connected to the control card CU via links that are not shown.

The switching matrix SE enables ATM cells from one ATM access port to be switched to another, however they also enable the cells to be switched to or from the gateway gate CIG to connecting a frame relaying line to an ATM line. The identifiers LPX and SUID serve to constitute addresses that can also be used for establishing communication via the backplane CR between a "source" entity and a "destination" entity situated respectively in the subassembly SS1' and in the subassembly SS2. These addresses are respectively of the form LPXs & SUIDs and LPXd & SUIDd. This communication is established by determining a path between the two addresses.

Figure 4:
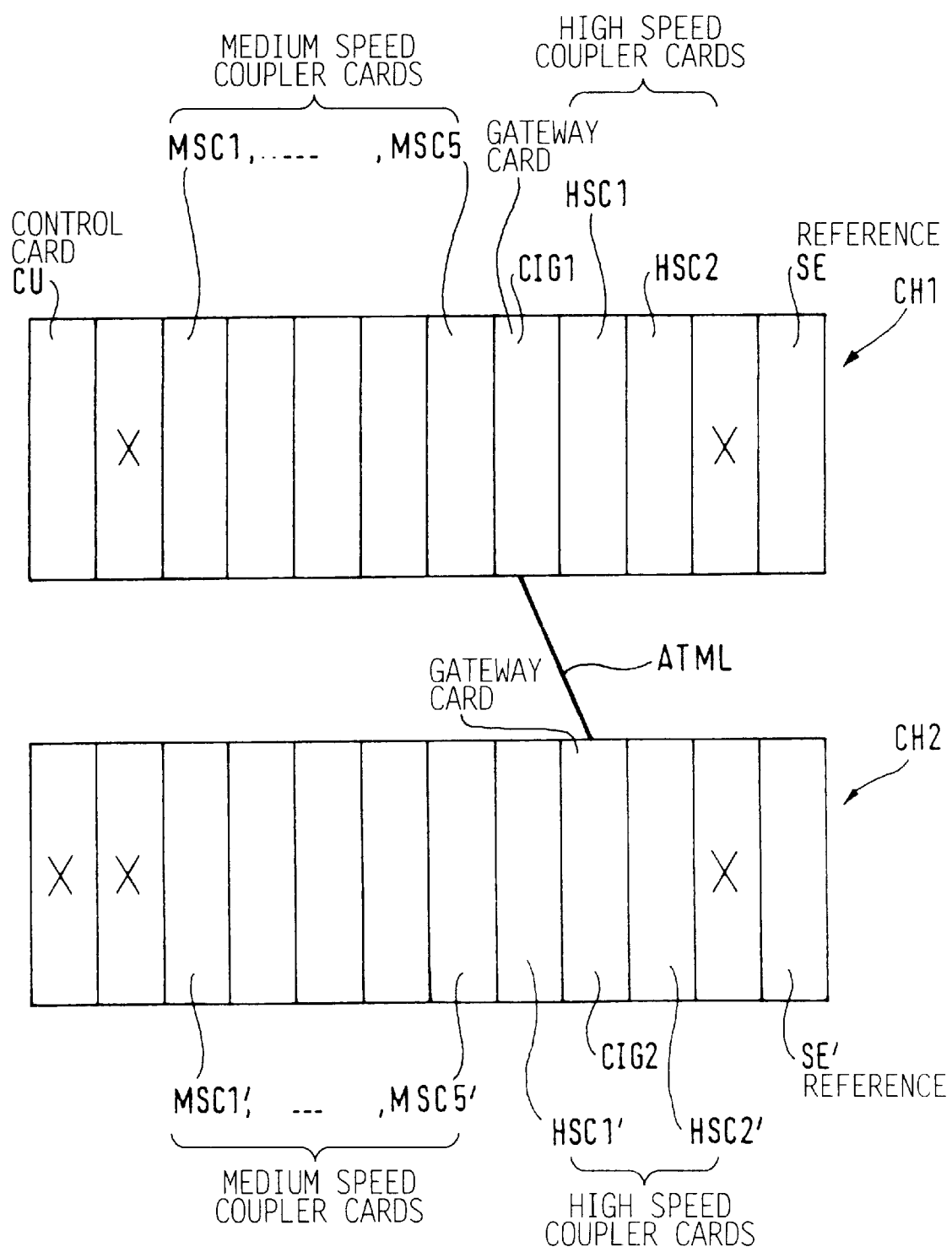
FIG. 4 is a block diagram of a third embodiment of a switch of the invention, including at least two chassis each constituted by means shown in FIGS. 1 and 3.

FIG. 4 shows a third embodiment of the switch of the invention, constituted by the chassis CH1 described above, without any modification, and at least one second chassis CH2, the two chassis being interconnected by an inter-chassis link referenced ATML that operates in asynchronous transfer mode. The chassis CH1 thus comprises:

a control card CU;

five medium speed coupler cards MSC1, . . . , MSC5, and five patch cards associated therewith; these patch cards are not shown and they are connected to frame relaying links (not shown);

a gateway card CIG1 having one of its inputs/outputs (e.g. ATM2) connected to the link ATML;

two high speed couplers HSC1 and HSC2 connected to ATM links that are not shown;

an ATM switching matrix card SE; and two locations referenced X that are reserved for possible redundant cards.

The chassis CH2 comprises:

an ATM switching matrix card SE';

medium speed coupler cards MSC1', ..., MSC5', associated with five patch cards which are not shown and which are connected to frame-relaying links (not shown);

a gateway card CIG2 having an ATM input/output connected to the inter-chassis link ATML;

two high speed coupler cards HSC1', HSC2', which are connected to ATM lines that are not shown; and three locations referenced X that are reserved for possible redundant cards.

For example, data is transmitted between the coupler card MSC1 of the chassis CH1 and the coupler card MSC5' of the chassis CH2 via the following: the gateway card CIG1, the switching matrix SE, the link ATML, the gateway card CIG2, and the switching matrix SE'. Data is transmitted between the coupler card HSC1 of the chassis CH1 and the coupler card HSC2' of the chassis CH2 via the following: the gateway card CIG1, the switching matrix SE, the link ATML, the gateway card CIG2, and the switching matrix SE'. Links between coupler cards of different types can be set up in analogous manner. The number of chassis may be greater than two, by connecting CH2 to a third chassis via another ATM access port, etc.

The implementation of the coupler cards HSC1, etc. and of the associated patches is conventional It should be observed that two gateway cards CIG can be provided in each chassis so as to enable one gateway card to back-up the other in the event of failure.

The identifiers LPX and SUID make it possible to provide addresses that can also be used for communication between a "source" entity and a "destination" entity respectively situated in the chassis CH1 and in the chassis CH2, the communication passing via the link ATML. These addresses are respectively of the form LPXs & SUIDs and LPXd & SUIDD. This communication is established by determining a path between these two addresses.

FIG. 5 is a functional diagram of the gateway card CIG1 and of the control card CU1. The gateway card CIG1 comprises two functional entities OM1' and LT' which are analogous to those described above, however the entity LT' includes two additional software entities:

a logic entity AAFD constituting an ATM matching function for data traffic, which issues and receives ATM cells via the input/output A which is connected to the matrix SE; and a software entity AAFDI constituting an ATM matching function interface for the data traffic, and which has the following functions:

setting up or clearing down an ATM connection in the matrix SE at the request of the manager LTMGT' as a function of routing information (a connection reference constituted by a virtual circuit identifier and a virtual trunk identity) read in the routing table referred to as the ATM routing table specific to the gateway card; the entity AAFD suppling in reply, when it has set up an ATM connection, a connection reference which corresponds to the routing implemented in the matrix SE;

issuing messages to the ATM world to forward these messages to other chassis; with the ATM connection reference being read in the ATM routing table; and receiving the messages from the ATM world; these messages are subsequently transferred to the destination software entity designated by the identifiers LPX and SUID contained in the header of the message.

The functional entities of the card CIG1 and of the card CU1 that are analogous to respective functional entities in the card MSC1 and the card CU are given the same references, together with a prime symbol. The description given above for the functional entities of the card MSC1 and of the card CU is therefore not repeated in full, and below only additional items are given to specify the special features of the operation of the gateway card CIG1 and of the control card CU1.

The updating entity CUSUP informs the manager CUMGT about all of the modifications to the configuration of the switch. The local connection control service CLCS informs the manager CUMGT about all of the modifications concerning the ATM connections. The manager CUMGT updates a second routing table referred to as the "common ATM routing table" concerning routing in the switch matrix SE, and it broadcasts it to the managers OMMGT of all of the active coupler cards via the entity IACS.

In this way, the manager CUMGT initializes and keeps up to date: a first routing table for each backplane CR, and a common ATM routing table. In addition, it stores the type of each card that sends it a message, i.e. whether the card is of the coupler type for MSC1, ..., MSC5, HSC1, ..., HSCS, or of the gateway type for CIG1.

The manager CUMGT of the control card CU1 communicates the routing table for the backplane CR to all of the active entities OMMGT in the coupler cards MSC1, ..., MSC5, and in the gateway cards CIG1, etc., that are present in the chassis CH1 under consideration. When a switch is constituted by a plurality of chassis, access possibilities to other chassis form a part of the data to be recorded in the routing table for the backplane CR.

The manager CUMGT co-operates with the local connection control service software entity CLCS to set up ATM connections internal to the switch between the gateway cards CIG1, CIG2, etc. belonging to different respective chassis. The manager CUMGT is informed by the entity CLCS each time a processor supporting a functional entity for terminating a frame-relaying line becomes active in a gateway card CIG. The manager CUMGT then calls the entity CLCS to set up an ATM connection between said gateway card CIG1 and all of the other gateway cards CIG that are active in the switch.

Conversely, if the processor(s) supporting the frame-relaying line termination function in one of the gateway cards CIG is no longer active, the manager CUMGT calls the software entity CLCS to clear down all ATM connections between said gateway card CIG and all of the other active gateway cards CIG in the switch Once an ATM connection has been set up or cleared down by the manager CUMGT, the manager updates the common ATM routing table by recording the reference of the connection therein. The updated table is then communicated to each of the gateway cards CIG that is active, to enable it to update its own ATM routing table.

In the event of the control card CU1 being restarted, the manager CUMGT reestablishes an internal communication service session in co-operation with the software entity CLCS and requests it to verify which ATM connections have already been set up.

Each manager OMMGT receives the two routing tables supplied by the manager CUMGT, together with their updates. The manager OMMGT of any given gateway card CIG performs the following functions:

Receiving the common routing table for the backplane of its own chassis, and deducing a "local" routing table therefrom, by adding information that is a function of the gateway card in question to the common routing table. As a general rule, there are two gateway cards per chassis to provide redundancy. Each gateway card CIG is allocated to a fraction of the medium speed coupler cards MSC Allocation is on the basis of a fixed criterion, based on proximity or on load sharing. The identities of allocated coupler cards are stored in the local routing table for the backplane.

Communicating the local backplane table to the manager LTMGT' of the functional entity LT' via an interface IMBPIa'.

Communicating the local ATM table to the manager LTMGT' of the functional entity LT' via the interface IMBPIa'. At the time the gateway card CIG is started, its local ATM routing table is initialized so as to be empty. Each time an entity LTMGT' receives an updated common ATM routing table, it deduces an updated local table therefrom specific to the gateway card in question. After updating, the local ATM routing table contains the identity of the virtual circuit and of the virtual trunk to be used for communicating with each gateway card CIG of another chassis, via the ATM logic entity AAFD.

In order to update the common ATM routing table, informing the functional entity OMSUP' of the identifiers LPX of the processors which become accessible or which become inaccessible, depending on the accessibilities of the chassis and the states of the processors.

The manager LTMGT' requests the entity AAFD to set up an ATM connection each time a new virtual circuit and virtual trunk identity has been added to the ATM routing table. The entity AAFD replies by supplying the reference of a connection. Also, the manger LTMGT' requests the entity AAFD to clear down a connection corresponding to a connection reference (virtual circuit and virtual trunk identity) whenever the connection has been cleared down in the updating of the common ATM routing table.

In addition to the functions described above for the message transfer software function SW of coupler cards MSC1, . . . , MSC6 in a single-chassis configuration, the software function SW' of the gateway card CIG also has the function of processing messages that arrive via the ATM Input/output referenced A, and the messages that arrive via the backplane CR and that are destined for another chassis.

Two cases need to be distinguished, depending on whether the software function SW' is implanted in a gateway card CIG or in a coupler card MSC1, . . . , MSC6:

For a software function SW' situated in a gateway card CIG, the identifier LPX is analyzed, and;

If it indicates that the destination entity is situated in the same chassis as the software function SW', then the software function uses the table of SUID identifiers of the software entity to transfer the message to the destination entity If the identifier LPX indicates that the destination identity is not situated in the same chassis, then the message must be transferred via an ATM connection, so it is given to the ATM matching software entity AAFD.

In the case of a software function SW' situated in a coupler card MSC that receives a message, it analyzes the processor identifier LPX, and if said identifier indicates that the destination software identity is not supported by the same processor as the software function SW' under consideration, then said function determines whether or not the destination entity is situated in the same chassis:

If it is situated in the same chassis, the message must be transferred via the backplane CR, and consequently it is given to the software entity CRH' of the backplane manager If the destination entity is situated in another chassis, the software function SW' then verifies whether or not the sending application has requested a secure transfer, and it verifies whether the destination entity is authorized to receive messages by secure transfer:

If the sending application has not requested a secure transfer, then the message is merely transmitted via an ATM connection using the entity AAFD.

If the sending application has requested a secure transfer, the message is saved in a memory by the entity SW' while it is being transferred by means of a question-and-answer type transfer mechanism between the sending entity and the destination entity. When the message is processed by the destination entity SW', it sends an acknowledgment of receipt. The message is deleted from the memory when the sending entity SW' has received this acknowledgment. If an acknowledgment is not received before the end of a time out, message transfer is repeated.

The software entity CRH' managing the backplane performs the same functions regardless of whether there is only one chassis or more. From the header of each message, it extracts the identifier LPX of the processor supporting the destination entity of the message. It then reads the backplane routing table to discover the information needed by the backplane interface CRI' to forward the message. In the special case of the destination entity of the message being situated on a card placed in another chassis, and if the card in question is not a gateway card CIG, but is a medium speed coupler card MSC or a high speed coupler card HSC, then the message is transferred to the gateway card CIG which is allocated to the coupler card in question. A gateway card CIG is allocated to a coupler card so as to share load between the gateway cards CIG of a given chassis. Allocation is reestablished each time a gateway card CIG is put into service in the chassis or is taken out of service .

In the receive direction, the function of the entity CRH' is to monitor the interface CRI' and retransmit the messages that said interface receives to the entity SW'.

What is claimed is:

1. A data frame switch comprising at least a first subassembly comprising:
a first plurality of interconnected medium speed couplers (i.e., first couplers) each comprising:
at least one line termination functional entity coupled to at least one input/output for data frames;
at least one operation and maintenance functional entity for interchanging control and status information between at least two of said medium speed couplers within said switch;
a first centralization means for centralizing information in each of said medium speed couplers concerning the states of all of the line termination functional entities situated in each of said medium speed couplers;
links such that each medium speed coupler is connected directly to each other medium speed coupler by at least one link specific to a pair of said medium speed couplers;
a second centralization means common to the switch as a whole:
to centralize for the switch all of the information centralized by the first centralization means in each medium speed coupler; and to establish a first routing table listing a first plurality of active paths existing between functional entities within each medium speed coupler for terminating frame-relaying lines in said first subassembly;

wherein the line termination functional entities, the first centralization means, and the second centralization means all comprise software entities each designated by a predetermined identifier, and all comprise at least one processor designated by a respective processor identifier determined by software entities as a function of the current configuration of the switch;

and wherein for communication between two software entities, each software entity has an address comprising both the identifier of said at least one processor executing each of said software entities and the identifier of each of said software entities.

2. The switch according to claim 1, wherein each processor identifier is made up of a chassis number, a card location number, and a logical number.

3. The switch according to claim 1, wherein communication between two software entities may be of a quality selected from two qualities:

communication that is not secure but that provides maximum performance during a data transfer stage; or communication that is secure and that is adapted to interchanges leading up to the data transfer stage.

4. A data frame switch comprising at least a first subassembly comprising:

a first plurality of interconnected medium speed couplers (i.e., first couplers) each comprising:
   at least one line termination functional entity coupled to at least one input/output for data frames;
   a first centralization means for centralizing information in each of said medium speed couplers concerning the states of all of the line termination functional entities situated in each of said medium speed couplers;
   links such that each medium speed coupler is within said switch is connected directly to each other medium speed couplers by at least one link specific to the medium speed coupler;

a second centralization means common to the switch as a whole:
   to centralize for the switch all of the information centralized by the first centralization means in each medium speed coupler; and
   to establish a first routing table listing a first plurality of active paths existing between functional entities within each medium speed coupler for terminating frame-relaying lines in said first subassembly;

wherein the line termination functional entities, the first centralization means, and the second centralization means all comprise software entities each designated by a predetermined identifier, and all comprise a processor designated by a respective processor identifier determined by the software entities as a function of the current configuration of the switch;

and wherein for communication between two software entities, each software entity has an address comprising both said identifier of each said processor executing each said software entity and the identifier of each said software entity, a first plurality of high speed couplers (i.e., second couplers) each including at least one functional entity for terminating an asynchronous transfer mode ATM line;

at least one gateway having:
   at least a first input/output coupled to at least one line termination functional entity for ATM cells; and
   a plurality of data frame inputs/outputs respectively and directly connected to each medium speed coupler via links such that each medium speed coupler is connected directly to one of the first inputs/outputs of the gateway via at least one link specific to the medium speed coupler; and an ATM switching matrix connected to an input/output of each high speed coupler and to the first input/output of the gateway to set up ATM connections;

and wherein the second centralization means initialize and update a second routing table referred to as a first common ATM routing table, containing the references of all the ATM connections set up by said matrix in said first subassembly.

5. The switch according to claim 4, including at least one second subassembly comprising:

a second plurality of medium speed couplers each comprising at least one line termination functional entity coupled to at least one input/output for data frames;

a second plurality of high speed couplers each comprising at least one ATM line termination functional entity, with at least one of the high speed couplers of the second subassembly being connected by an ATM line to a high speed coupler for the first subassembly;

at least one gateway having:
   at least a first input/output coupled to at least one line termination functional entity of ATM cells; and
   a plurality of data frame inputs/outputs connected respectively and directly to each medium speed coupled via links such that each medium speed coupler is connected directly to one of the inputs/outputs of the gateway via at least link specific to said medium speed coupler; and links such that each medium speed coupler of the second subassembly connected directly to each of the other said medium speed couplers of the second subassembly via at least one link specific to the medium speed coupler;

and the second centralization means of the first subassembly also:
   centralizes for the switch all of the information centralized by the first centralization means of all of the medium speed couplers;
   establishes in said first routing table a listing of a second plurality of active paths existing in the second subassembly between line termination functional entities for relaying frames; and
   initializes and updates a second common ATM routing table containing the references of all of the ATM connections set up by the matrix in said second subassembly.

6. The switch according to claim 5, wherein, automatic load sharing is performed between said at least one gateway in said first subassembly and said at least one gateway in said second subassembly when there exist a plurality of possible active paths between said first and second subassemblies.

* * * * *